US012686267B2

(12) United States Patent
Sadamura et al.

(10) Patent No.: US 12,686,267 B2
(45) Date of Patent: Jul. 21, 2026

(54) VEHICLE CONTROL DEVICE AND CONTROL METHOD

(71) Applicant: HONDA MOTOR CO., LTD., Tokyo (JP)

(72) Inventors: Satoshi Sadamura, Tokyo (JP); Soichiro Ueura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 18/817,249

(22) Filed: Aug. 28, 2024

(65) Prior Publication Data

US 2025/0074188 A1     Mar. 6, 2025

(30) Foreign Application Priority Data

Aug. 31, 2023     (JP) ................................. 2023-140982

(51) Int. Cl.
*B60K 31/00*          (2006.01)

(52) U.S. Cl.
CPC ................................ *B60K 31/0058* (2013.01)

(58) Field of Classification Search
CPC ................ B60K 31/00; B60K 31/0058; B60K 2310/22; B60W 30/146; B60W 40/105; B60W 50/14; B60W 2050/146; B60W 2540/215; B60W 2555/60
USPC .......................................................... 701/93
See application file for complete search history.

(56) References Cited

U.S. PATENT DOCUMENTS

| | | | |
|---|---|---|---|
| 2015/0197248 A1* | 7/2015 | Breed | G08G 1/096775 340/905 |
| 2018/0079410 A1 | 3/2018 | Yamashita et al. | |
| 2019/0156150 A1* | 5/2019 | Krishnan | G06V 20/597 |
| 2021/0001849 A1 | 1/2021 | Miura | |
| 2021/0295443 A1* | 9/2021 | Webster | H04W 4/029 |
| 2021/0347381 A1* | 11/2021 | Zhu | B60W 10/04 |
| 2022/0297692 A1* | 9/2022 | Imanishi | B60W 30/18163 |
| 2023/0050759 A1* | 2/2023 | Borhan | B60K 35/28 |
| 2023/0069732 A1* | 3/2023 | Aggoune | B60W 50/14 |
| 2024/0005670 A1* | 1/2024 | Ro | B60W 40/02 |
| 2024/0208498 A1* | 6/2024 | Hawley | B60W 40/076 |
| 2024/0208520 A1* | 6/2024 | Gupta | B60W 10/18 |

(Continued)

FOREIGN PATENT DOCUMENTS

| | | | | |
|---|---|---|---|---|
| CN | 118197071 A | * | 6/2024 | G08G 1/09623 |
| CN | 120096318 A | * | 6/2025 | B60K 35/28 |

(Continued)

OTHER PUBLICATIONS

May 13, 2025, Translation of Japanese Office Action issued for related JP Application No. 2023-140982.

*Primary Examiner* — Atul Trivedi
(74) *Attorney, Agent, or Firm* — Paratus Law Group, PLLC

(57)     ABSTRACT

A vehicle control device controls a vehicle. The control device includes circuitry configured to: detect a speed limit of a road on which the vehicle travels based on peripheral information on the vehicle obtained by an external sensor that the vehicle has; present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed.

10 Claims, 12 Drawing Sheets

(56) References Cited

U.S. PATENT DOCUMENTS

| | | | | |
|---|---|---|---|---|
| 2025/0121841 A1 * | 4/2025 | Okubo | ................ | B60W 30/146 |
| 2025/0289450 A1 * | 9/2025 | Yoshikawa | ......... | B60W 30/182 |
| 2025/0313231 A1 * | 10/2025 | Nojoumian | ......... | B60W 60/001 |

FOREIGN PATENT DOCUMENTS

| | | | | |
|---|---|---|---|---|
| DE | 112011104550 B4 * | 7/2024 | ......... | G01C 21/3469 |
| EP | 4522472 B1 * | 1/2026 | ............ | B60W 30/14 |
| FR | 3135241 A1 * | 11/2023 | ............ | B60K 35/28 |
| FR | 3150173 A1 * | 12/2024 | ............ | B60W 50/14 |
| FR | 3158484 A1 * | 7/2025 | ............ | B60W 50/14 |
| JP | 2005-001566 A | 1/2005 | | |
| JP | 2009-208661 A | 9/2009 | | |
| JP | 2018-047718 A | 3/2018 | | |
| JP | 7361117 B2 * | 10/2023 | .............. | G08G 1/09 |
| WO | WO 2019/186691 A1 | 10/2019 | | |
| WO | WO-2023129646 A2 * | 7/2023 | ............ | G01S 7/003 |
| WO | WO-2023189084 A1 * | 10/2023 | ............ | B60W 50/14 |
| WO | WO-2024156026 A1 * | 8/2024 | ........ | B60W 50/0097 |

* cited by examiner (FIG. 1 CONTINUED)
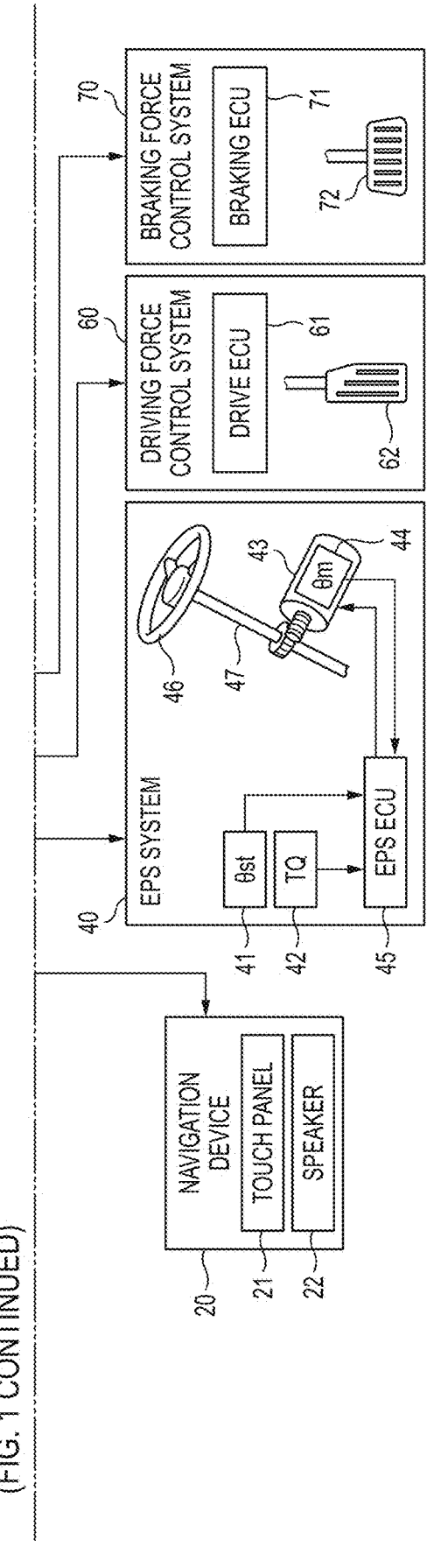

FIG. 11

VEHICLE CONTROL DEVICE AND CONTROL METHOD

CROSS-REFERENCE TO RELATED APPLICATIONS

This application is based on and claims priority under 35 USC 119 from Japanese Patent Application No. 2023-140982 filed on Aug. 31, 2023, the contents of which are incorporated herein by reference.

TECHNICAL FIELD

The present disclosure relates to a vehicle control device and a control method.

BACKGROUND

In recent years, attempts have been made to provide access to a sustainable transportation system in consideration of vulnerable traffic participants.

As one of the attempts, research and development on driving support technique and automated driving technique of a moving object (for example, a vehicle such as an automobile) have been performed in order to improve safety and convenience of traffic.

For example, Japanese Patent Application Laid-Open Publication No. 2005-001566 discloses a technology in which: a vehicle control device, if a preceding vehicle is present traveling ahead of a host vehicle, executes following travel control for causing the host vehicle to travel following the preceding vehicle; and if no preceding vehicle is present, executes constant speed travel control for causing the host vehicle to travel at a set vehicle speed set in advance. The vehicle control device notifies a suggested set vehicle speed, which is a vehicle speed suggested to a driver as the set vehicle speed. Thereafter, if it is determined that a change command instructing to change the set vehicle speed is obtained, the vehicle control device changes the set vehicle speed to a value indicated by the suggested set vehicle speed.

However, in the related art, there is room for improvement from the viewpoint of enabling the user to cause the vehicle to travel or at an appropriate or desired speed with a simple operation if the travel speed of the vehicle is to be controlled in an automated manner.

The present disclosure provides a vehicle control device and a control method that enable a user to cause a vehicle to travel or at an appropriate or desired speed with a simple operation. This further improves traffic safety, and contributes to development of a sustainable transportation system.

SUMMARY

A first aspect of the present disclosure relates to a vehicle control device for controlling a vehicle. The control device includes circuitry configured to: detect a speed limit of a road on which the vehicle travels based on peripheral information on the vehicle obtained by an external sensor that the vehicle has; present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed.

A second aspect of the present disclosure relates to a control method performed by a computer for controlling a vehicle. The control method includes: detecting a speed limit of a road on which the vehicle travels based on peripheral information on the vehicle obtained by an external sensor included in the vehicle; presenting a user of the vehicle, as a suggested speed, either a first speed based on the detected speed limit or a second speed set by the user; and performing travel control of controlling a travel speed of the vehicle with the presented suggested speed as a target speed in response to the user's approval of the suggested speed.

BRIEF DESCRIPTION OF DRAWINGS

Exemplary embodiments of the present disclosure will be described in detail based on the following figures, wherein:

FIG. 11 is a diagram illustrating a fifth operation example of the vehicle 1.

DESCRIPTION OF EMBODIMENTS

Figure 1:
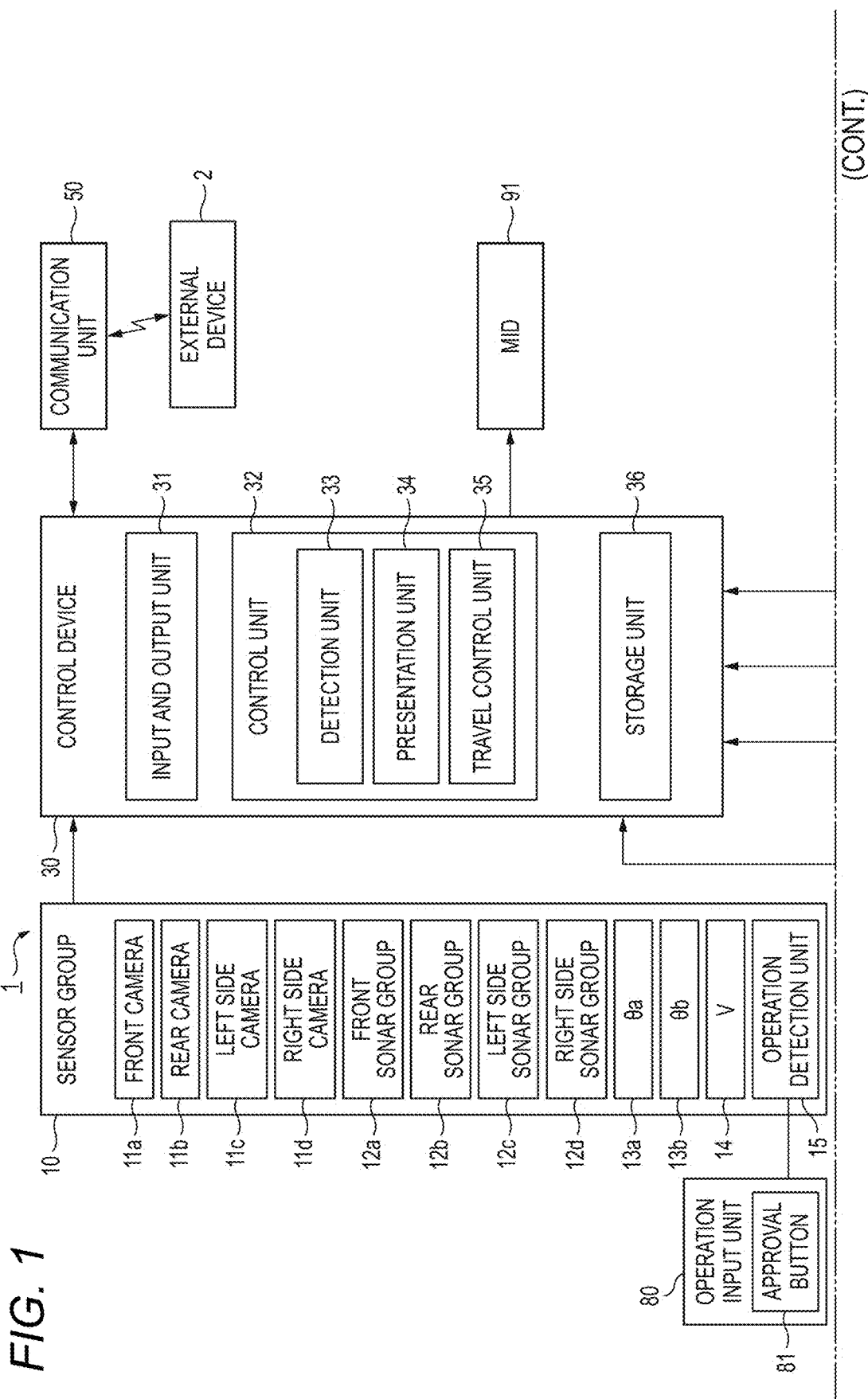
FIG. 1 is a diagram illustrating a vehicle 1 controlled by a control device 30 that is an embodiment of a vehicle control device of the present disclosure.

Hereinafter, an embodiment of a vehicle control device and a control method of the present disclosure will be described in detail with reference to the drawings.

The drawings are viewed in directions of reference numerals. The following embodiment does not limit inventions disclosed in the claims, and not all combinations of features described in the embodiment are necessarily essential for the inventions. Two or more features among a plurality of features described in the embodiment may be combined freely. Further, in the following description, the same or similar elements are denoted by the same or similar reference numerals, and description thereof may be omitted or simplified appropriately.

Configuration of Vehicle

FIG. 1 is a diagram illustrating a vehicle 1 controlled by a control device 30 that is an embodiment of a vehicle control device of the present disclosure. The vehicle 1 illustrated in FIG. 1 is an automobile including a drive source, and wheels (none illustrated) including drive wheels driven by power of the drive source and driven wheels that can be steered. For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of the electric motor and the internal combustion engine. Further, the drive source of the vehicle 1 may drive the pair of left and right front wheels, the pair of left and right rear wheels, or the four wheels including the pair of left and right front wheels and the pair of left and right rear wheels. Either one of the front wheels and the rear wheels may be driven wheels that can be steered, or both may be driven wheels that can be steered.

As illustrated in FIG. 1, the vehicle 1 includes a sensor group 10, a navigation device 20, a control device 30, an EPS system (electric power steering system) 40, a communication unit 50, a driving force control system 60, a braking force control system 70, an operation input unit 80, and an MID (multi information display) 91.

The sensor group 10 obtains various detection values related to the vehicle 1 or a periphery of the vehicle 1. The detection values obtained by the sensor group 10 are sent to the control device 30, and provided for control of the vehicle 1 (for example, ACC and TSR to be described later) performed by the control device 30.

The sensor group 10 includes, for example, a front camera 11a, a rear camera 11b, a left side camera 11c, a right side camera 11d, a front sonar group 12a, a rear sonar group 12b, a left side sonar group 12c, and a right side sonar group 12d. The camera group and the sonar group can function as external sensors that obtain peripheral information on the vehicle 1.

The front camera 11a, the rear camera 11b, the left side camera 11c, and the right side camera 11d output image data of the peripheral images obtained by imaging the periphery of the vehicle 1 to the control device 30. The peripheral images captured by the front camera 11a, the rear camera 11b, the left side camera 11c, and the right side camera 11d are also referred to as a front image, a rear image, a left side image, and a right side image. Further, an image constituted by the left side image and the right side image is also referred to as a side image.

The front sonar group 12a, the rear sonar group 12b, the left side sonar group 12c, and the right side sonar group 12d emit sound waves to the periphery of the vehicle 1, and receive reflected sounds from another object. The front sonar group 12a includes, for example, four sonars. The sonars that constitute the front sonar group 12a are provided on an obliquely left front side, a front left side, a front right side, and an obliquely right front side of the vehicle 1. The rear sonar group 12b includes, for example, four sonars. The sonars that constitute the rear sonar group 12b are provided on an obliquely left rear side, a rear left side, a rear right side, and an obliquely right rear side of the vehicle 1. The left side sonar group 12c includes, for example, two sonars. The sonars that constitute the left side sonar group 12c are provided on a left front side and a left rear side of the vehicle 1. The right side sonar group 12d includes, for example, two sonars. The sonars that constitute the right side sonar group 12d are provided on a right front side and a right rear side of the vehicle 1. Instead of or in addition to the sonar groups 12a, 12b, 12c, and 12d, the vehicle 1 may be provided with a radar device that emits radio waves (for example, so-called millimeter radio waves) to the periphery of the vehicle 1 and receives reflected waves from the other object.

The sensor group 10 further includes wheel sensors 13a and 13b, a vehicle speed sensor 14, and an operation detection unit 15. The wheel sensors 13a and 13b detect rotation angles θa and θb of the wheels (not illustrated). The wheel sensors 13a and 13b may be implemented by angle sensors or displacement sensors. The wheel sensors 13a and 13b output detection pulses every time the wheels are rotated by a predetermined angle. The detection pulses output from the wheel sensors 13a and 13b can be used for calculating a rotation angle of the wheels and a rotation speed of the wheels. A movement distance of the vehicle 1 can be calculated based on the rotation angle of the wheels. The wheel sensor 13a detects, for example, the rotation angle θa of the left rear wheel. The wheel sensor 13b detects, for example, the rotation angle θb of the right rear wheel.

The vehicle speed sensor 14 detects a vehicle speed V that is a travel speed of the vehicle 1, and outputs the detected vehicle speed V to the control device 30. The vehicle speed sensor 14 detects the vehicle speed V based on, for example, rotation of a transmission countershaft.

The operation detection unit 15 detects the operation content performed by a user (for example, a driver who is an occupant driving vehicle 1; the same applies to the following) using the operation input unit 80 and outputs the detected operation content to the control device 30. The operation input unit 80 includes, for example, an approval button 81. The approval button 81 is an operator to be pressed when the user approves a suggested speed presented by recommendation described later, and is provided, for example, on the steering 46.

The operation input unit 80 may further include an operation button, an operation switch, or the like that receives an operation related to the ACC, such as an operation of instructing start and end of the ACC and an operation of setting a target speed to be described later. Further, a part (for example, the operation button that receives the operation related to the ACC) or all of the operation input unit 80 may be shared with an input device of a touch panel 21 to be described later.

The navigation device 20 identifies a current position of the vehicle 1 using, for example, a global positioning system (GPS) and guides the user on a route from the current position of the vehicle 1 to a destination. The navigation device 20 includes, for example, a storage device (not illustrated) including a map information database.

The navigation device 20 includes a touch panel 21 and a speaker 22. The touch panel 21 is implemented by integrating a display device (for example, a liquid crystal display) capable of displaying an image with an input device capable of receiving input of information, and functions as the display device controlled by the control device 30 and as the input device that receives input of various types of information to the control device 30. That is, the touch panel 21 displays various screens under the control of the control device 30, and inputs various commands received from the user to the control device 30. The speaker 22 outputs various types of guidance by voice under the control of the control device 30.

The EPS system 40 includes a steering angle sensor 41, a torque sensor 42, an EPS motor 43, a resolver 44, and an electronic control unit (EPS ECU) 45. The steering angle sensor 41 detects a steering angle θst of a steering 46. The torque sensor 42 detects a torque TQ applied to the steering 46. The EPS motor 43 gives a driving force or a reaction force to a steering column 47 coupled to the steering 46, thereby supporting an operation on the steering 46 (in other words, steering). The resolver 44 detects a rotation angle θm of the EPS motor 43.

The EPS ECU 45 includes, for example, an input and output unit, a calculation unit, and a storage unit (none illustrated), and controls the entire EPS system 40. Further, the EPS ECU 45 outputs information indicating the steering angle θst of the steering 46 detected by the steering angle sensor 41 to the control device 30. Further, the EPS ECU 45 may output information indicating a steering speed ω of the steering 46 to the control device 30. The steering speed ω is obtained by, for example, differentiating the steering angle θst with respect to time.

The communication unit 50 is a communication interface that communicates with an external device 2 under the control performed by the control device 30. That is, the control device 30 can communicate with the external device 2 via the communication unit 50. Examples of the external device 2 include a terminal device (for example, a smartphone) of the user and a server device managed by a manufacturer of the vehicle 1. For example, a mobile communication network such as a cellular line, Wi-Fi (registered trademark), Bluetooth (registered trademark), or the like can be adopted for the communication between the vehicle 1 and the external device 2.

The driving force control system 60 includes a drive ECU 61, and can control a driving force of the vehicle 1. The drive ECU 61 includes, for example, an input and output unit, a calculation unit, and a storage unit (none illustrated), and controls the driving force of the vehicle 1 by controlling an internal combustion engine, an electric motor, or the like, which is the drive source of the vehicle 1, based on an operation (hereinafter also referred to as an "accelerator operation") of the user on an accelerator pedal 62 provided in the vehicle 1 or an instruction from the control device 30.

The braking force control system 70 includes a braking ECU 71 and can control a braking force of the vehicle 1. The braking ECU 71 includes, for example, an input and output unit, a calculation unit, and a storage unit (none illustrated), and controls the braking force of the vehicle 1 by controlling a brake device (not illustrated) of the vehicle 1 based on an operation (hereinafter also referred to as a "brake operation") of the user on a brake pedal 72 provided in the vehicle 1 or an instruction from the control device 30. The brake device of the vehicle 1 includes, for example, a brake caliper, a cylinder that transmits a hydraulic pressure to the brake caliper, and an electric motor that generates a hydraulic pressure in the cylinder. The braking ECU 71 generates a braking force corresponding to a brake operation by controlling an electric motor of the brake device based on the brake operation or an instruction from the control device 30.

An MID 91 is configured with a display device capable of displaying an image (for example, a liquid crystal display), and is provided at a position that can be visually recognized by a user seated in the driver's seat of the vehicle 1 (for example, in the meter panel of the vehicle 1). The MID 91 displays various screens in accordance with the control by the control device 30. The MID 91 may be shared with the display device of the touch panel 21.

Control Device

The control device 30 is a device (computer) that integrally controls the entire vehicle 1 based on information input from the sensor group 10, the navigation device 20, the EPS system 40, the communication unit 50, the driving force control system 60, the braking force control system 70, and the like.

The control device 30 includes, for example, an input and output unit 31, a control unit 32, and a storage unit 36. The input and output unit 31 is an interface that inputs and outputs data between the inside and outside of the control device 30 under control performed by the control unit 32.

The storage unit 36 includes, for example, a nonvolatile storage medium such as a flash memory, and stores various types of information (for example, data and programs) for controlling an operation of the vehicle 1.

The control unit 32 includes, for example, a processor such as a central processing unit (CPU), and controls components of the vehicle 1 by executing programs stored in the storage unit 36 or the like. In the present embodiment, the control unit 32 includes a detection unit 33, a presentation unit 34, and a travel control unit 35 as functional units implemented by the processor executing programs.

The travel control unit 35 has a function capable of executing constant speed travel and inter-vehicle distance control as an example of travel control according to the present disclosure. The constant speed travel and inter-vehicle distance control is also referred to as "ACC (adaptive cruise control)". In the present embodiment, the constant speed travel and inter-vehicle distance control are also referred to as "ACC" hereinafter.

The ACC includes "constant speed travel control" of controlling the vehicle 1 such that the vehicle speed V (that is, the travel speed of the vehicle 1) is the predetermined target speed set by the user, and "inter-vehicle distance control" of controlling the vehicle 1 such that the inter-vehicle distance between the vehicle 1 and another vehicle traveling in front of the vehicle 1 (hereinafter referred to as "preceding vehicle" as well) is substantially constant. That is, during the ACC, if no preceding vehicle is present, the vehicle 1 is controlled such that the vehicle speed V becomes the target speed described above, and if a preceding vehicle is present, the vehicle 1 is controlled so as to follow the preceding vehicle while keeping the inter-vehicle distance with the preceding vehicle at a substantially constant value.

For example, the control unit 32 starts the ACC by the travel control unit 35 when receiving an operation indicating to start the ACC via the operation input unit 80, and thereafter ends the ACC by the travel control unit 35 when receiving an operation instructing to end the ACC via the operation input unit 80.

If there is a brake operation in the vehicle 1 traveling under ACC, the control unit 32 suspends the ACC by the travel control unit 35 and decelerates the vehicle 1 in response to the brake operation. Then, if a predetermined condition (for example, approval of a suggested speed described later) is established after the ACC is suspended, the control unit 32 resumes the ACC by the travel control unit 35.

The detection unit 33 has a function of detecting a speed limit of a road on which the vehicle 1 travels (hereinafter, also simply referred to as a "speed limit") based on peripheral information on the vehicle 1 obtained by an external sensor included in the vehicle 1. For example, the detection unit 33 recognizes a speed sign provided on the road on which the vehicle 1 travels from a peripheral image obtained by the front camera 11a or the like using pattern matching. When recognizing the speed sign provided on the road on which the vehicle 1 travels, the detection unit 33 detects the speed limit by recognizing the speed indicated by the speed sign by image analysis.

The detection unit 33 may also recognize a traffic sign other than a speed sign provided on a road on which the vehicle 1 travels, and obtain information indicated by the traffic sign. Such traffic sign recognition function for recognizing traffic signs such as a speed sign based on the peripheral information on the vehicle 1 is also referred to as "TSR (traffic sign recognition)". In the present embodiment, the traffic sign recognition function is also referred to as "TSR" hereinafter.

The presentation unit 34 has a function of presenting the user, as a suggested speed, either a first speed based on the speed limit detected by the detection unit 33 or a second speed set by the user of the vehicle 1.

Here, the first speed can be a speed that is the sum of the speed limit detected by the detection unit 33 (that is, the speed limit of the road on which the vehicle 1 travels) and an offset speed set by the user. In the present embodiment, the user can set a desired offset speed within a range of −10 [km/h] to +10 [km/h] via the operation input unit 80 or the like. For example, if the speed limit detected by the detection unit 33 is 50 [km/h] and the offset speed set by the user is +10 [km/h], the first speed is 50 [km/h]+10 [km/h]=60 [km/h].

The second speed may be a speed set by the user as the target speed of the previous ACC. In the present embodiment, upon ACC, the user can set any speed as the target speed via the operation input unit 80 or the like, or can also set the suggested speed as the target speed by performing an operation (for example, pressing the approval button 81) of approving the suggested speed presented in accordance with the recommendation described later.

For example, when the ACC is not performed after the ACC is suspended or ended, the presentation unit 34 presents the user either the first speed or the second speed as the suggested speed by displaying on the MID 91. More specifically, for example, the presentation unit 34 presents the user the suggested speed by displaying a recommendation image G1 (see FIG. 4) or a recommendation image G2 (see FIG. 6), which will be described later, on the MID 91. The presentation of the suggested speed by the presentation unit 34 is also simply referred to as "recommendation" hereinafter.

The presentation unit 34 starts the recommendation is started at a predetermined start timing, and ends the recommendation when the suggested speed presented by the recommendation is approved by the user (that is, when the approval button 81 is pressed). In addition, the presentation unit 34 ends the recommendation if a predetermined end timing after the start of recommendation is reached even without the approval by the user.

The start timing of recommendation can be appropriately determined by the manufacturer of the vehicle 1 or the like, and can be the time when any one or more of the following (Condition 1) to (Condition 7) are satisfied.

(Condition 1) Immediately after the ACC is suspended
(Condition 2) When there is an accelerator operation after the ACC is suspended (the operation amount on the accelerator pedal 62 and/or the vehicle speed V may be further limited to a threshold or more))
(Condition 3) When a brake operation is released after the ACC is suspended
(Condition 4) When the vehicle speed V approaches the target speed set at the time of the previous ACC, or when it is predicted that the vehicle speed V approaches the target speed set at the time of the previous ACC based on the operation amount on the accelerator pedal 62, the acceleration in the vehicle 1, etc.
(Condition 5) When the vehicle speed V approaches the speed limit of the road on which the vehicle 1 travels, or when it is predicted that the vehicle speed V approaches the speed limit of the road on which the vehicle 1 travels based on the operation amount on the accelerator pedal 62, the acceleration in the vehicle 1, etc.
(Condition 6) When it is recognized from a peripheral image obtained by the front camera 11a, etc. that the vehicle 1 passes an intersection after the ACC is suspended
(Condition 7) When it is estimated based on the yaw rate, the steering angle θst, etc. of the vehicle 1 that the vehicle 1 turns right or left after the ACC is suspended The end timing of recommendation can also be appropriately determined by the manufacturer of the vehicle 1 or the like, and can be the time when any one or more of the following (Condition 8) to (Condition 12) are satisfied. It should be noted that the end timing of recommendation needs to be determined to match the start timing of recommendation.

(Condition 8) When a certain period of time elapses after the start of recommendation
(Condition 9) When the vehicle 1 moves by a certain distance after the start of recommendation
(Condition 10) When the vehicle speed V deviates by a threshold or more from the suggested speed presented by the recommendation or continues deviating by the threshold or more for a certain period of time after the start of the recommendation, although without the presence of any factor for speed adjustment such as a preceding vehicle or a curve
(Condition 11) When it is recognized from a peripheral image obtained by the front camera 11a, etc. that the vehicle 1 passes an intersection after the start of recommendation
(Condition 12) When it is estimated based on the yaw rate, the steering angle θst, etc. of the vehicle 1 that the vehicle 1 turns right or left after the start of recommendation By starting the recommendation at the start timing as described above and ending the recommendation at the end timing as described above, the presentation unit 34 can present the user the suggested speed in an appropriate presentation time at an appropriate timing. For example, if the end timing of the recommendation is set according to the above (Condition 10), the recommendation can be ended if it is assumed that the vehicle speed V deviates by the threshold or more from the suggested speed presented by the recommendation, that is, if it is assumed that the suggested speed presented by the recommendation is likely to be approved by the user. As a result, it is possible to prevent a recommendation that may annoy the user from being performed over a long time.

The travel control unit 35 performs the ACC with the suggested speed presented by the presentation unit 34 as the target speed in response to the user's approval of the suggested speed. For example, if the approval button 81 is pressed in the recommendation in which 50 [km/h] is presented as the suggested speed, the travel control unit 35 sets 50 [km/h] as the target speed and performs the ACC.

According to such a configuration, when the target speed desired by the user is presented as the suggested speed, the user can perform the ACC by a simple operation of approving the suggested speed, and cause the vehicle 1 to travel at the desired vehicle speed V without appropriately performing an accelerator operation and/or a brake operation. This can improve the convenience of the user.

In such a configuration, it is important to present the target speed desired by the user as the suggested speed. Therefore, for example, the control device 30 controls the vehicle 1 as follows to present a suggested speed that is more likely the target speed desired by the user.

[Schematic Operation of Vehicle Until Resuming ACC]

First, an example of a schematic operation from when the vehicle 1 traveling under ACC suspends the ACC in response to a brake operation of the user until the ACC is resumed will be described with reference to FIG. 2.

Figure 2:
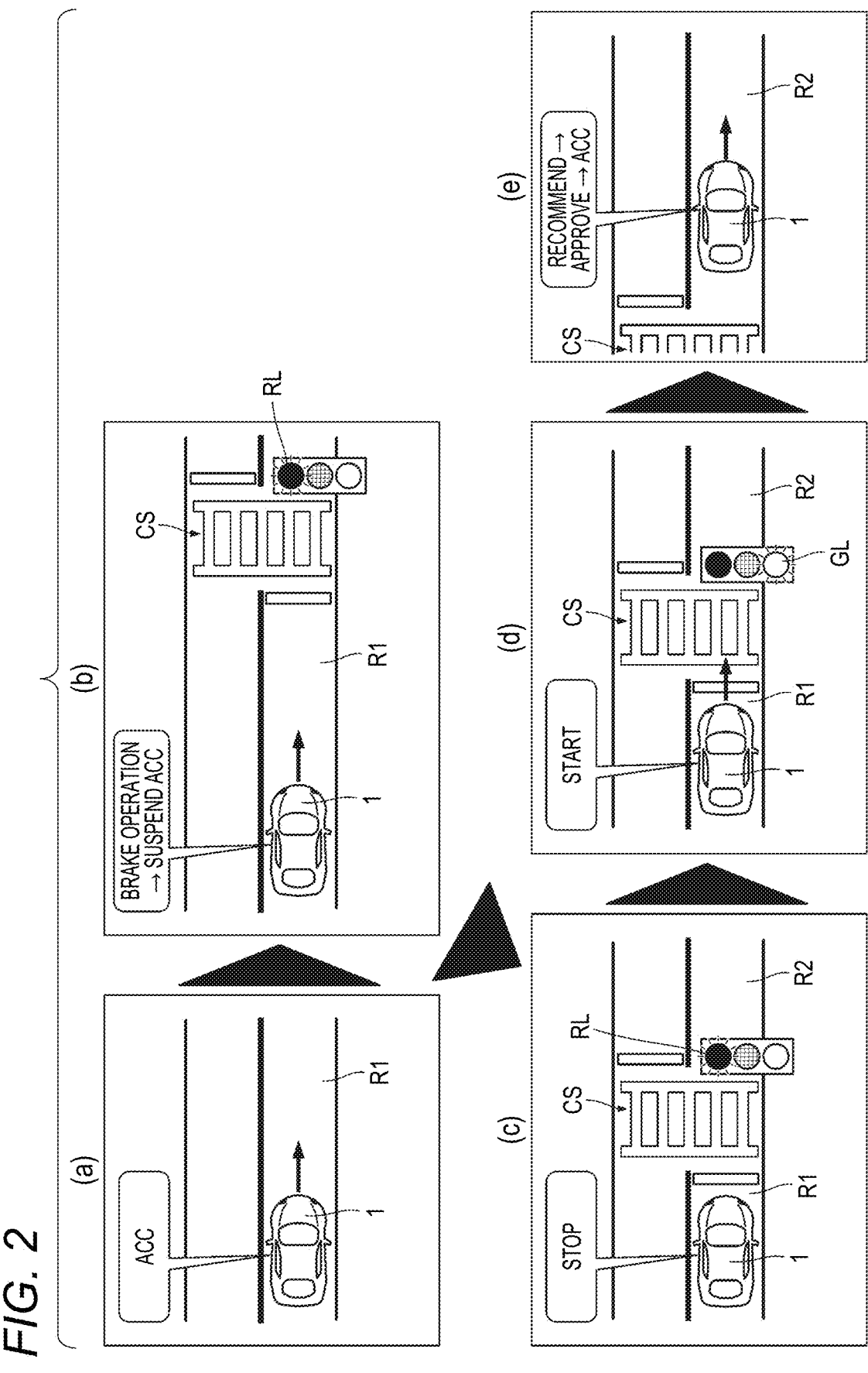
FIG. 2 is a diagram illustrating an example of a schematic operation from when the vehicle 1 traveling under ACC suspends the ACC in response to a brake operation of the user until the ACC is resumed.

In (a) of FIG. 2, the vehicle 1 is traveling on a road R1 under ACC. Thereafter, when the user performs a brake operation because a red signal RL of a traffic light provided at the intersection CS in front of the vehicle 1 is turned on in the road R1 as illustrated in (b) of FIG. 2, the ACC is suspended in the vehicle 1 and the vehicle 1 decelerates in response to the brake operation. Then, the vehicle 1 stops before the intersection CS as illustrated in (c) of FIG. 2.

Thereafter, when a green signal GL of the traffic light provided at the intersection CS is turned on as illustrated in (d) of FIG. 2, the user starts the vehicle 1 by performing an accelerator operation. For example, if there is an accelerator operation after the ACC is suspended and the vehicle speed V of the vehicle 1 accelerated in response to the accelerator operation reaches a threshold, the control device 30 performs recommendation by the presentation unit 34 as illustrated in (e) of FIG. 2. In the example illustrated in (e) of FIG. 2, the recommendation is performed when the vehicle 1 is traveling on a road R2 ahead of the intersection CS of the road R1. When the suggested speed presented by the recommendation is approved by the user, the control device 30 performs the ACC by the travel control unit 35 with the suggested speed as the target speed.

In the example described here, the recommendation is performed at a predetermined timing after the ACC is suspended in response to the brake operation. For example, similarly to the example described here, the recommendation is also performed at a predetermined timing after the ACC is ended in response to an operation instructing to end the ACC, and when the suggested speed presented by the recommendation is approved by the user, the ACC may be performed with the suggested speed as the target speed.

First Example of Operation of Vehicle

Next, a first example of the operation of the vehicle 1 will be described with reference to FIG. 3. In the following description, the same portions as those in the example described with reference to FIG. 2 will be appropriately omitted.

Figure 3:
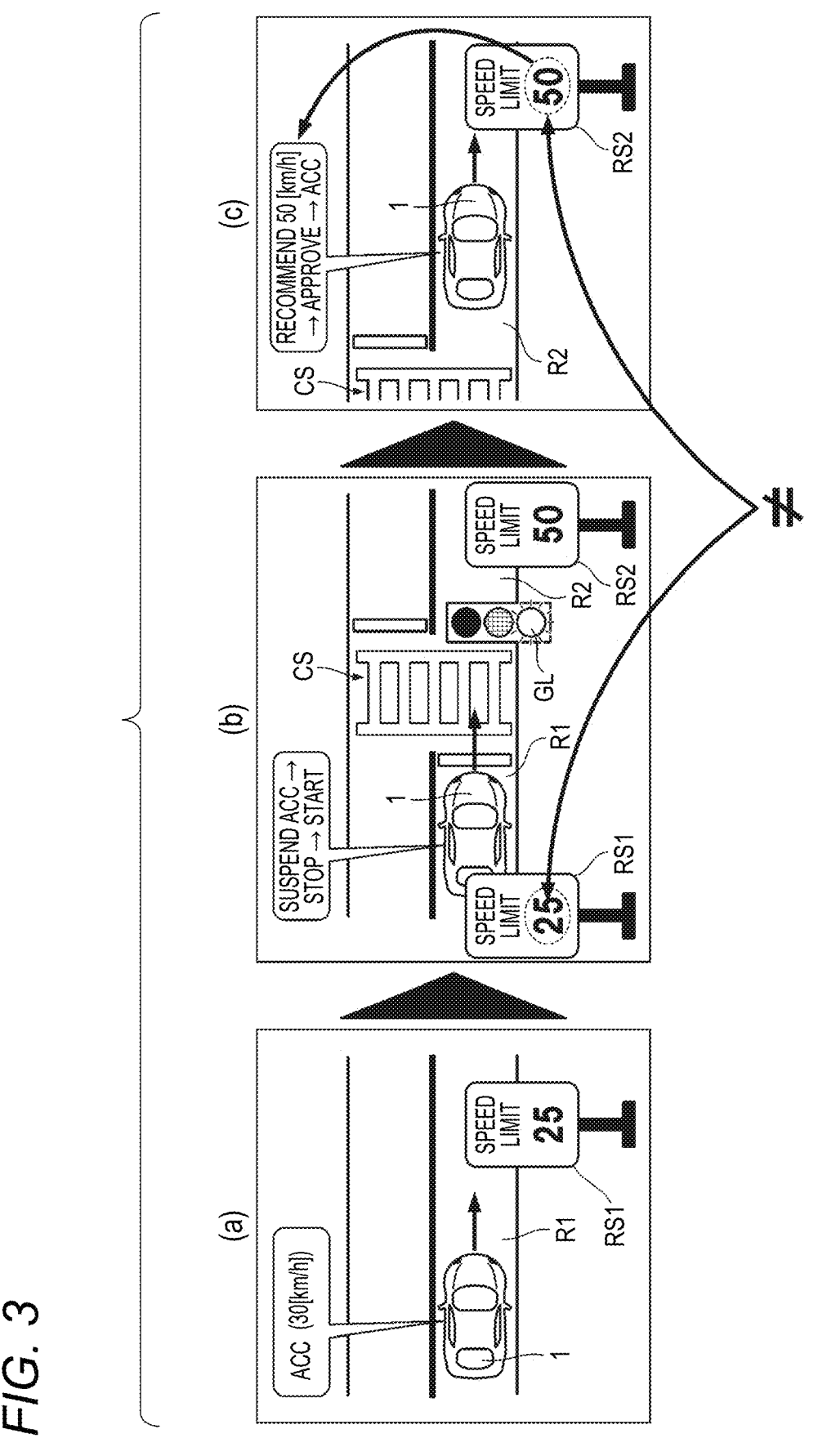
FIG. 3 is a diagram illustrating a first operation example of the vehicle 1.

The first example illustrated in FIG. 3 is an example in which the speed limit of the road R1 and the speed limit of the road R2 are different from each other. In (a) of FIG. 3, the vehicle 1 is traveling on the road R1 under ACC. In the example illustrated in FIG. 3, the speed limit of the road R1 is 25 [km/h], and the road R1 is provided with a speed sign RS1 indicating that the speed limit is 25 [km/h]. In such a case, when the vehicle 1 is traveling on the road R1, the control device 30 detects the speed limit 25 [km/h] of the road R1 by TSR performed by the detection unit 33. In the example illustrated in FIG. 3, it is assumed that the vehicle 1 travels on the road R1 under ACC with 30 [km/h], which is slightly deviated from the speed limit 25 [km/h] of the road R1, as the target speed.

Thereafter, as illustrated in (b) of FIG. 3, it is assumed that the user suspends (or ends) the ACC and stops the vehicle 1 before the intersection CS, and then starts the vehicle 1 by performing an accelerator operation to cause the vehicle 1 to enter the road R2 ahead of the intersection CS of the road R1. In the example illustrated in FIG. 3, the speed limit of the road R2 is 50 [km/h], and the road R2 is provided with a speed sign RS2 indicating that the speed limit is 50 [km/h]. In such a case, when the vehicle 1 is traveling on the road R2, the control device 30 detects the speed limit 50 [km/h] of the road R2 by TSR performed by the detection unit 33.

Thereafter, the control device 30 (the presentation unit 34) performs the recommendation at a predetermined start timing as described above. As in the example illustrated in FIG. 3, if the speed limit of the road R2 on which the vehicle 1 travels when the recommendation is performed is different from the speed limit of the road R1 when the previous ACC is suspended or ended, the control device 30 performs the recommendation of presenting the user the first speed based on the speed limit of the road R2 as the suggested speed.

Figure 4:
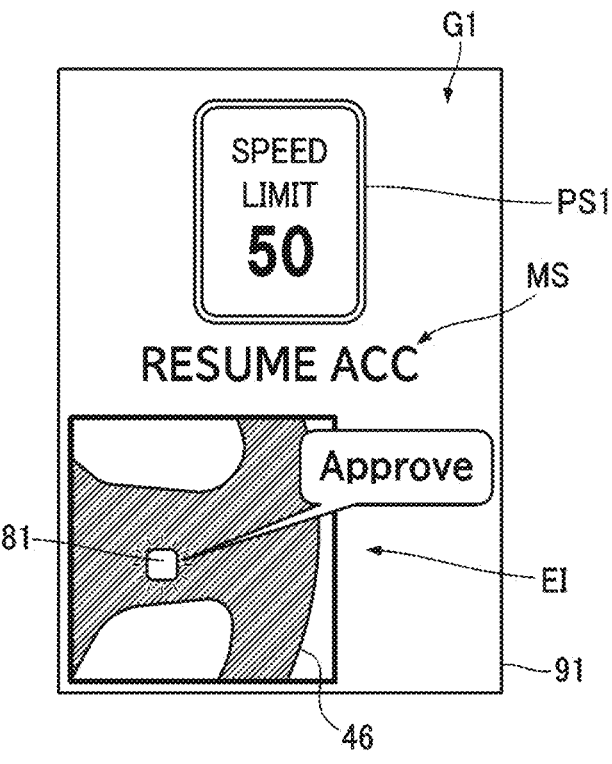
FIG. 4 is a diagram illustrating a recommendation image G1 as an example of a recommendation image.

The recommendation of presenting the user the first speed based on the speed limit of the road on which the vehicle 1 travels as the suggested speed is performed, for example, by displaying the recommendation image G1 illustrated in FIG. 4 on the MID 91.

As illustrated in FIG. 4, the recommendation image G1 includes an image PS1 indicating that the suggested speed is based on the speed limit of the road on which the vehicle 1 travels (that is, the first speed; 50 [km/h] in the example illustrated in FIG. 4), an explanatory image EI indicating the method for approving the suggested speed (pressing the approval button 81 provided on the steering 46 in the example illustrated in FIG. 4), and a message MS indicating that the ACC can be resumed under the approval (a message "RESUME ACC" in the example illustrated in FIG. 4).

When the user presses the approval button 81 while the recommendation image G1 illustrated in FIG. 4 is displayed on the MID 91, it is assumed that the suggested speed 50 [km/h] is approved, and, the control device 30 sets 50 [km/h] as the target speed and performs the ACC as illustrated in (c) of FIG. 3.

As described above, if the speed limit of the road on which the vehicle 1 travels (the road R2 in the example illustrated in FIG. 3) is different from the speed limit of the road at which the previous ACC is suspended or ended (the road R1 in the example illustrated in FIG. 3), the presentation unit 34 of the control device 30 presents the user the first speed based on the speed limit of the road on which the vehicle 1 travels as the suggested speed.

That is, if the speed limit of the road on which the vehicle 1 is currently traveling is different from the speed limit of the road when the previous ACC is suspended or ended, the first speed based on the speed limit of the road on which the vehicle 1 is currently traveling is more likely the target speed currently desired by the user than is the second speed set by the user at the previous ACC. Therefore, if the speed limit of the road on which the vehicle 1 travels is different from the speed limit of the road when the previous ACC is suspended or ended, the first speed, which is more likely the target speed desired by the user, is presented to the user as the suggested speed. Thereby, the user can cause the vehicle 1 to travel at a desired speed by a simple operation of approving the suggested speed. This can improve the convenience of the user.

Second Example of Operation of Vehicle

Next, a second example of the operation of the vehicle 1 will be described with reference to FIG. 5. In the following description, the same portions as those in the example described with reference to FIG. 2 or FIG. 3 will be appropriately omitted.

Figure 5:
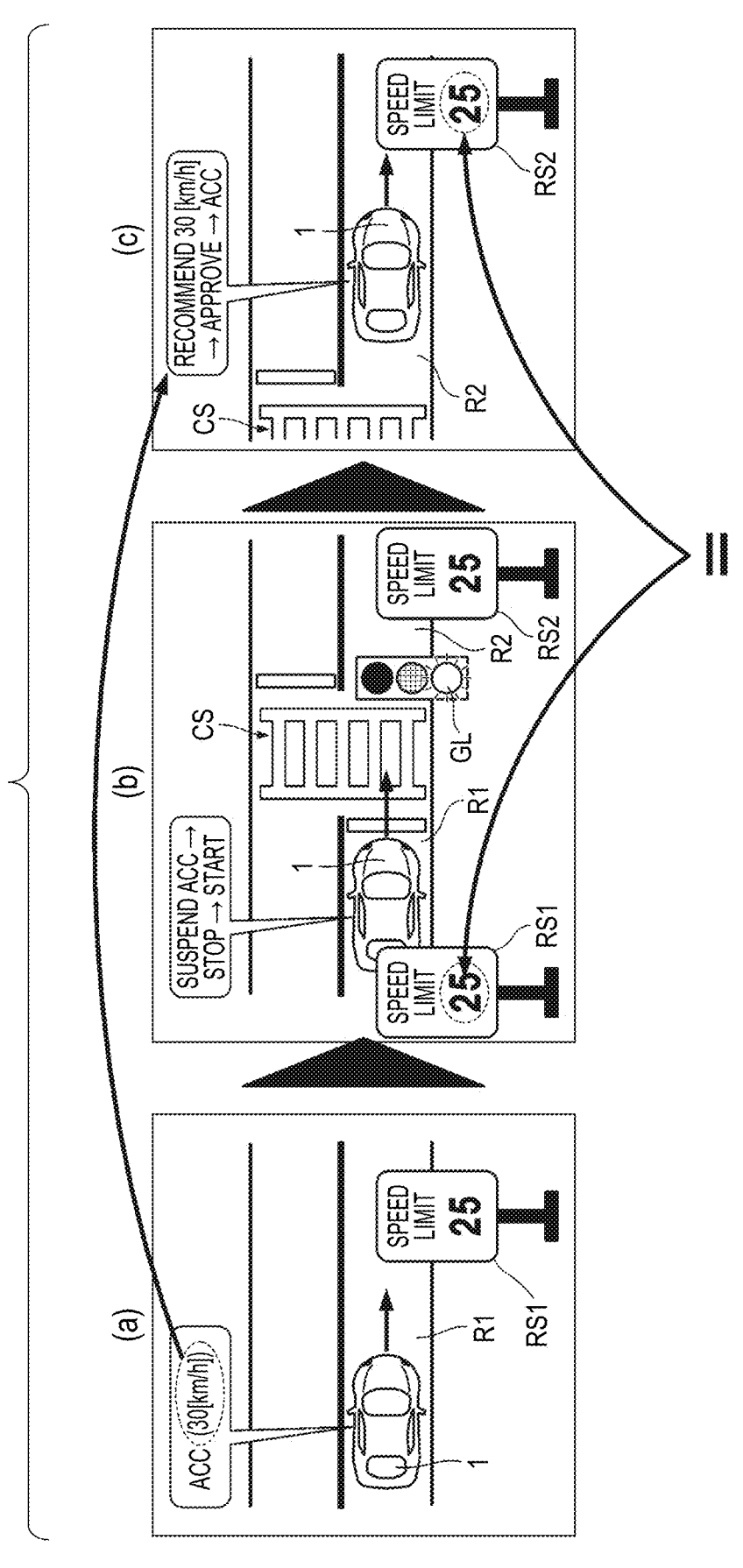
FIG. 5 is a diagram illustrating a second operation example of the vehicle 1.

The second example illustrated in FIG. 5 is an example in which the speed limit of the road R1 and the speed limit of the road R2 are the same. In (a) of FIG. 5, it is assumed that the vehicle 1 travels on the road R1 under ACC with 30 [km/h] as the target speed.

Thereafter, as illustrated in (b) of FIG. 5, it is assumed that the user suspends (or ends) the ACC and stops the vehicle 1 before the intersection CS, and then starts the vehicle 1 by performing an accelerator operation to cause the vehicle 1 to enter the road R2 ahead of the intersection CS of the road R1. In the example illustrated in FIG. 5, similarly to the road R1, the speed limit of the road R2 is also 25 [km/h], and the road R2 is provided with a speed sign RS2 indicating that the speed limit is 25 [km/h]. In such a case, when the vehicle 1 is traveling on the road R2, the control device 30 detects the speed limit 25 [km/h] of the road R2 by TSR performed by the detection unit 33.

Thereafter, the control device 30 (the presentation unit 34) performs the recommendation at a predetermined start timing as described above. As in the example illustrated in FIG. 5, if the speed limit of the road R2 on which the vehicle 1 travels when the recommendation is performed is the same as the speed limit of the road R1 when the previous ACC is suspended or ended, the control device 30 performs the recommendation of presenting the user the second speed, which is the target speed of the previous ACC, as the suggested speed.

Figure 6:
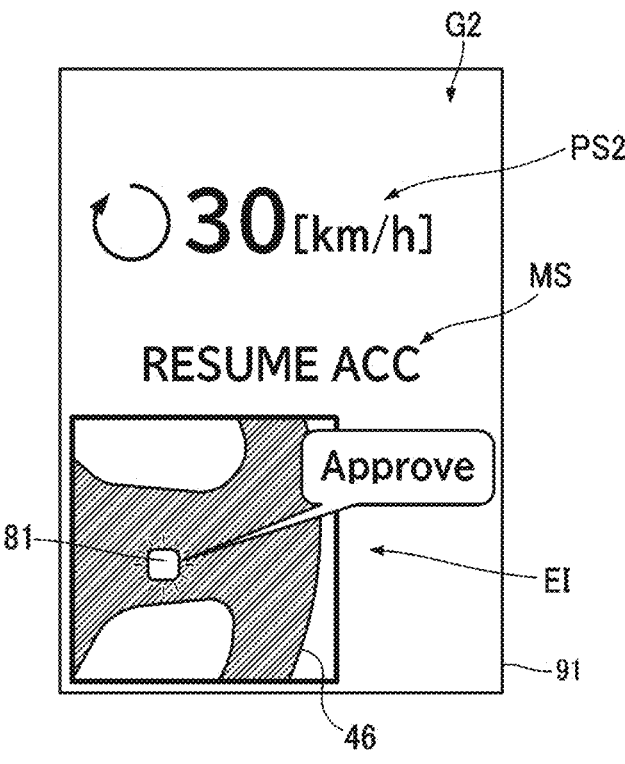
FIG. 6 is a diagram illustrating a recommendation image G2 as another example of a recommendation image.

The recommendation of presenting the user the second speed, which is the target speed of the previous ACC, as the suggested speed is performed, for example, by displaying the recommendation image G2 illustrated in FIG. 6 on the MID 91.

As illustrated in FIG. 6, the recommendation image G2 includes an image PS2 indicating that the suggested speed is the target speed of the previous ACC (that is, the second speed; 30 [km/h] in the example illustrated in FIG. 6), and the explanatory image EI and the message MS described above.

When the user presses the approval button 81 while recommendation image G2 illustrated in FIG. 6 is displayed on the MID 91, it is assumed that the suggested speed 30 [km/h] is approved, and the control device 30 sets 30 [km/h] as the target speed and performs the ACC as illustrated in (c) of FIG. 5.

As described above, if the speed limit of the road on which the vehicle 1 travels (the road R2 in the example illustrated in FIG. 5) is the same as the speed limit of the road when the previous ACC is suspended or ended (the road R1 in the example illustrated in FIG. 5), the presentation unit 34 of the control device 30 presents the user the second speed, which is the target speed of the previous ACC, as the suggested speed.

That is, if the speed limit of the road on which the vehicle 1 is currently traveling is the same as the speed limit of the road when the previous ACC is suspended or ended, the second speed similar to the previous ACC is more likely the target speed currently desired by the user than is the first speed based on the speed limit of the road on which the vehicle 1 is currently traveling. Therefore, if the speed limit of the road on which the vehicle 1 travels is the same as the speed limit of the road when the previous ACC is suspended or ended, the second speed, which is more likely the target speed desired by the user, is presented to the user as the suggested speed. Thereby, the user can cause the vehicle 1 to travel at a desired speed by a simple operation of approving the suggested speed. This can improve the convenience of the user.

Third Example of Operation of Vehicle

Next, a third example of the operation of the vehicle 1 will be described with reference to FIG. 7. In the following description, the same portions as those in the example described with reference to FIG. 2 or FIG. 3 will be appropriately omitted.

Figure 7:
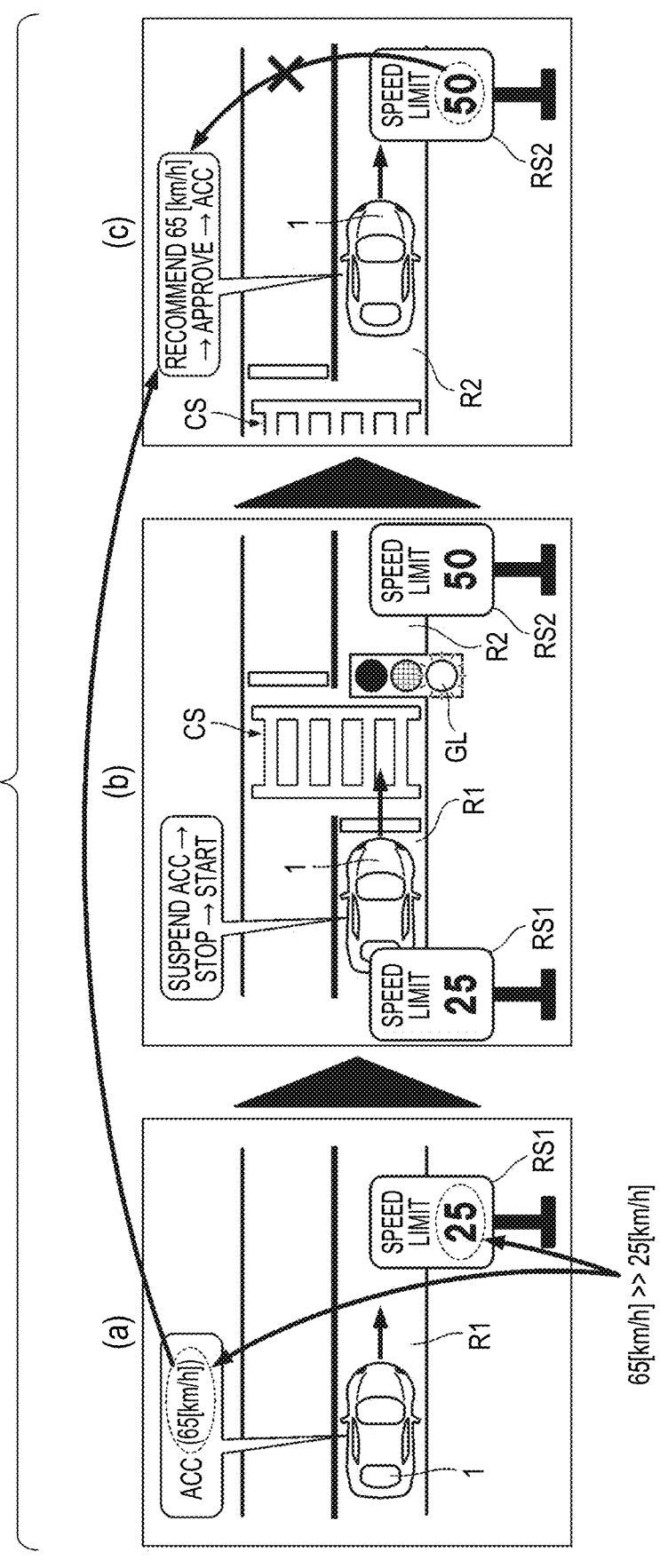
FIG. 7 is a diagram illustrating a third operation example of the vehicle 1.

The third example illustrated in FIG. 7 is another example in which the speed limit of the road R1 and the speed limit of the road R2 are different from each other. In (a) of FIG. 7, it is assumed that the vehicle 1 travels on the road R1 under ACC with 65 [km/h], which is greatly deviated from the speed limit 25 [km/h] of the road R1, as the target speed.

Thereafter, as illustrated in (b) of FIG. 7, it is assumed that the user suspends (or ends) the ACC and stops the vehicle 1 before the intersection CS, and then starts the vehicle 1 by performing an accelerator operation to cause the vehicle 1 to enter the road R2 ahead of the intersection CS of the road R1. In the example illustrated in FIG. 7, the speed limit of the road R2 is 50 [km/h], and the road R2 is provided with a speed sign RS2 indicating that the speed limit is 50 [km/h]. In such a case, when the vehicle 1 is traveling on the road R2, the control device 30 detects the speed limit 50 [km/h] of the road R2 by TSR performed by the detection unit 33.

In the example illustrated in FIG. 7, the offset speed described above is set to +10 [km/h]. In this case, the first speed of the vehicle 1 traveling on the road R2 is 50 [km/h]+10 [km/h]=60 [km/h]. The 60 [km/h] as the first speed is lower than 65 [km/h] as the second speed, which is the target speed of the previous ACC.

In such a case, as illustrated in (c) of FIG. 7, even if the speed limit of the road R1 and the speed limit of the road R2 are different from each other, the control device 30 (that is, the presentation unit 34) performs the recommendation of presenting the second speed (here, 65 [km/h]), which is the target speed of the previous ACC, as the suggested speed. Then, when the user presses the approval button 81 while such recommendation is performed, it is assumed that the suggested speed 65 [km/h] is approved, and the control device 30 sets 65 [km/h] as the target speed and performs the ACC.

As described above, even if the speed limit of the road R2 on which the vehicle 1 travels is different from the speed limit of the road R1 when the previous ACC is suspended or ended, the presentation unit 34 of the control device 30 presents the user the second speed as the suggested speed if the target speed of the previous ACC (that is, the second speed) deviates by a predetermined value (for example, 15 [km/h]) or more from the speed limit of the road R1 when the previous ACC is suspended or ended.

That is, if the previous ACC causes the vehicle 1 to travel at a target speed deviated by a predetermined value or more from the speed limit of the road at that time, it is considered that the user desires to cause the vehicle 1 to travel at this speed regardless of the speed limit of the road under certain circumstances. Therefore, if the second speed, which is the target speed of the previous ACC, deviates by the predetermined value or more from the speed limit of the road when the previous ACC is suspended or ended (in other words, lower than the speed limit by the predetermined value or more, or higher than the speed limit by the predetermined value or more), the second speed, which is more likely the target speed desired by the user, is presented to the user as the suggested speed. Thereby, the user can cause the vehicle 1 to travel at a desired speed by a simple operation of approving the suggested speed. This can improve the convenience of the user.

In particular, if the previous ACC causes the vehicle 1 to travel at a target speed higher by the predetermined value or more than the speed limit of the road at that time, it is considered that the user strongly desires to cause the vehicle 1 to travel at this speed regardless of the speed limit. For example, if the second speed that is the target speed of the previous ACC is higher by the predetermined value or more than the speed limit of the road when the previous ACC is suspended or ended, the presentation unit 34 of the control device 30 presents the user the second speed, which is more likely the target speed desired by the user, as the suggested speed. Accordingly, the user can cause the vehicle 1 to travel at a desired speed with a simple operation of approving the suggested speed.

The predetermined value is, for example, a value greater than the offset speed. That is, if the second speed, which is the target speed of the previous ACC, is higher by the offset speed set by the user than the speed limit of the road when the previous ACC is suspended or ended, it is considered that the user desires to cause the vehicle to travel at this speed. Therefore, if the second speed, which is the target speed of the previous ACC, is higher by the offset speed set by the user than the speed limit of the road when the previous ACC is suspended or ended, the second speed, which is more likely the target speed desired by the user, is presented to the user as the suggested speed. Thereby, the user can cause the vehicle 1 to travel at a desired speed by a simple operation of approving the suggested speed. This can improve the convenience of the user.

Fourth Example of Operation of Vehicle

Next, a fourth example of the operation of the vehicle 1 will be described with reference to FIG. 8. In the following description, the same portions as those in the example described with reference to FIG. 2, 3, or 7 will be appropriately omitted.

Figure 8:
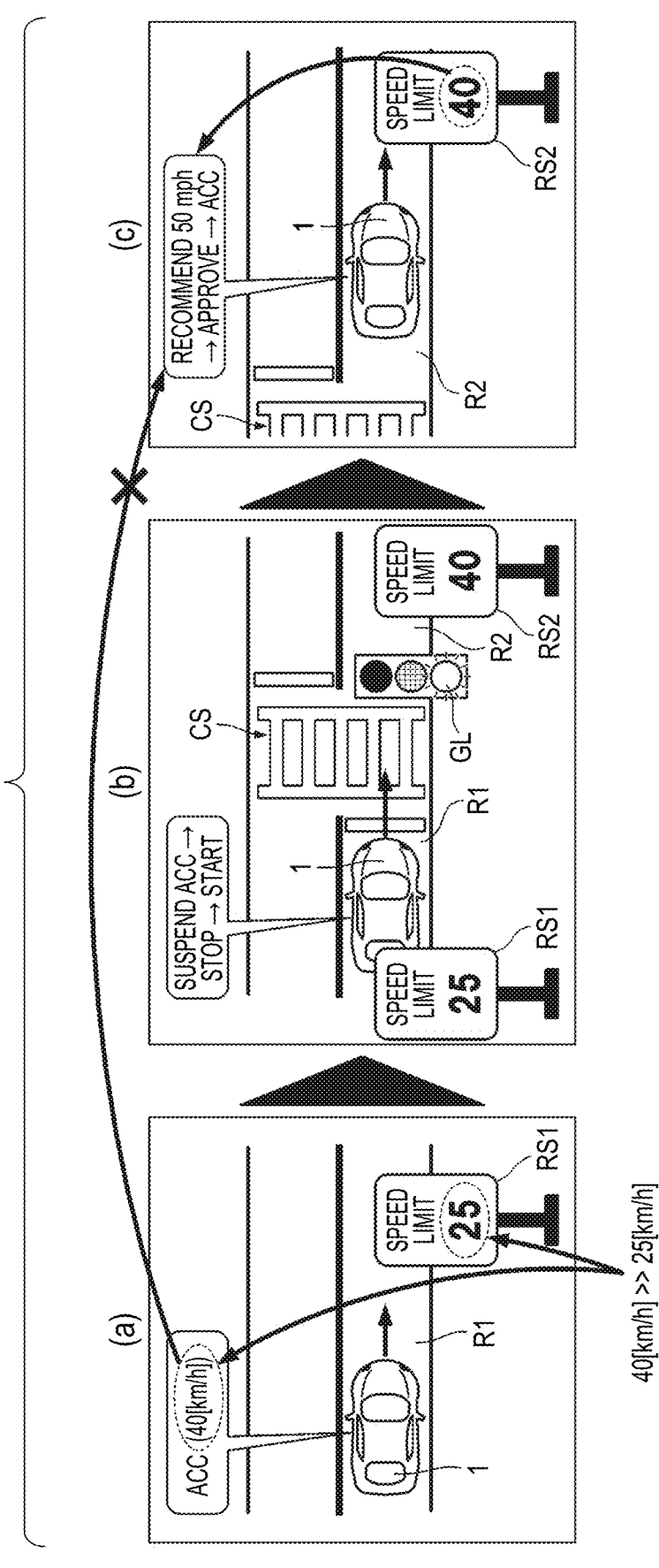
FIG. 8 is a diagram illustrating a fourth operation example of the vehicle 1.

The fourth example illustrated in FIG. 8 is different from the third example illustrated in FIG. 7 in that the first speed in the vehicle 1 traveling on the road R2 is higher than the second speed, which is the target speed set by the user in the previous ACC.

That is, in (a) of FIG. 8, it is assumed that the vehicle 1 travels on the road R1 under ACC with 40 [km/h], which is greatly deviated from the speed limit 25 [km/h] of the road R1, as the target speed.

Thereafter, as illustrated in (b) of FIG. 8, it is assumed that the user suspends (or ends) the ACC and stops the vehicle 1 before the intersection CS, and then starts the vehicle 1 by performing an accelerator operation to cause the vehicle 1 to enter the road R2 ahead of the intersection CS of the road R1. In the example illustrated in FIG. 8, the speed limit of the road R2 is 40 [km/h], and the road R2 is provided with a speed sign RS2 indicating that the speed limit is 40 [km/h]. In such a case, when the vehicle 1 is traveling on the road R2, the control device 30 detects the speed limit 40 [km/h] of the road R2 by TSR performed by the detection unit 33.

In the example illustrated in FIG. 8, the offset speed is set to +10 [km/h]. In this case, the first speed of the vehicle 1 traveling on the road R2 is 40 [km/h]+10 [km/h]=50 [km/h]. The 50 [km/h] as the first speed is higher than 40 [km/h] as the second speed, which is the target speed set by the user at the previous ACC.

In such a case, as illustrated in (c) of FIG. 8, the control device 30 (that is, the presentation unit 34) performs the recommendation of presenting the first speed (here, 50 [km/h]) based on the speed limit of the road R2 on which the vehicle 1 travels at the time of recommendation as the suggested speed. Then, when the user presses the approval button 81 while such recommendation is performed, it is assumed that the suggested speed 50 [km/h] is approved, and the control device 30 sets 50 [km/h] as the target speed and performs the ACC.

As described above, if the speed limit of the road R2 on which the vehicle 1 travels is different from the speed limit of the road R1 when the previous ACC is suspended or ended, the presentation unit 34 of the control device 30 presents the user the first speed as the suggested speed if the target speed of the previous ACC (that is, the second speed) deviates by a predetermined value (for example, 15 [km/h]) or more from the speed limit of the road R1 when the previous ACC is suspended or ended and is lower than the first speed based on the speed limit of the road R2 on which the vehicle 1 travels when the recommendation is performed.

That is, if the first speed is higher than the second speed, the user is more likely to desire to set the first speed as the target speed than the second speed. If the first speed is higher than the second speed, the first speed is presented to the user as the suggested speed. Thereby, the user can cause the vehicle 1 to travel at a desired speed by a simple operation of approving the suggested speed.

Presentation Time of Suggested Speed

Next, the presentation time of the suggested speed according to the recommendation will be described. It is preferable that the presentation unit 34 of the control device 30 changes the presentation time of the suggested speed (for example, the display time of the recommendation image G1 or the recommendation image G2) depending on the difference between the suggested speed in the recommendation and the vehicle speed V (that is, the travel speed of the vehicle 1) when the suggested speed is presented to the user based on the recommendation.

For example, if the vehicle speed V when the suggested speed is presented deviates from the suggested speed (for example, if the difference between the vehicle speed V and the suggested speed is greater than a threshold), it is considered that the user is less likely to approve the suggested speed (that is, to allow the vehicle to travel at the suggested speed). In such a case, the presentation unit 34 shortens the presentation time of the suggested speed to promptly end the presentation of a suggested speed less likely to be approved by the user. As a result, it is possible to prevent the presentation of the suggested speed that may annoy the user to continue over a long time.

On the other hand, if the vehicle speed V when the suggested speed is presented is close to the suggested speed (for example, if the difference between the vehicle speed V and the suggested speed is smaller than the threshold), it is considered that the user is more likely to approve the suggested speed. In such a case, the presentation unit 34 lengthens the presentation time of the suggested speed. This can prevent the user from failing to approve the suggested speed, so that the user can reliably approve the suggested speed and start the ACC.

In addition, it is considered that the user is less likely to approve the suggested speed if the vehicle speed V when the suggested speed is presented is higher than the suggested speed, while the user is more likely to approve the suggested speed if the vehicle speed V when the suggested speed is presented is lower than the suggested speed. Therefore, the presentation unit 34 may shorten the presentation time if the difference between the suggested speed and the vehicle speed V when the suggested speed is presented to the user is large, compared to a case where the difference is small. As a result, it is possible to prevent the presentation of the suggested speed that may annoy the user to continue over a long time.

As described above, the control device 30 (the presentation unit 34) may present the user the suggested speed at an appropriate presentation time by lengthening the presentation time of the suggested speed in a situation where it is assumed that the user is more likely to approve the suggested speed, and shortening the presentation time of the suggested speed in a situation where it is assumed that the user is less likely to approve the suggested speed.

Processing Performed by Control Device

Next, an example of processing executed by the control device 30 will be described with reference to FIGS. 9 and 10. For example, the control device 30 executes the processing illustrated in FIGS. 9 and 10 while the vehicle 1 is activated (for example, while the ignition power supply is on).

Figure 9:
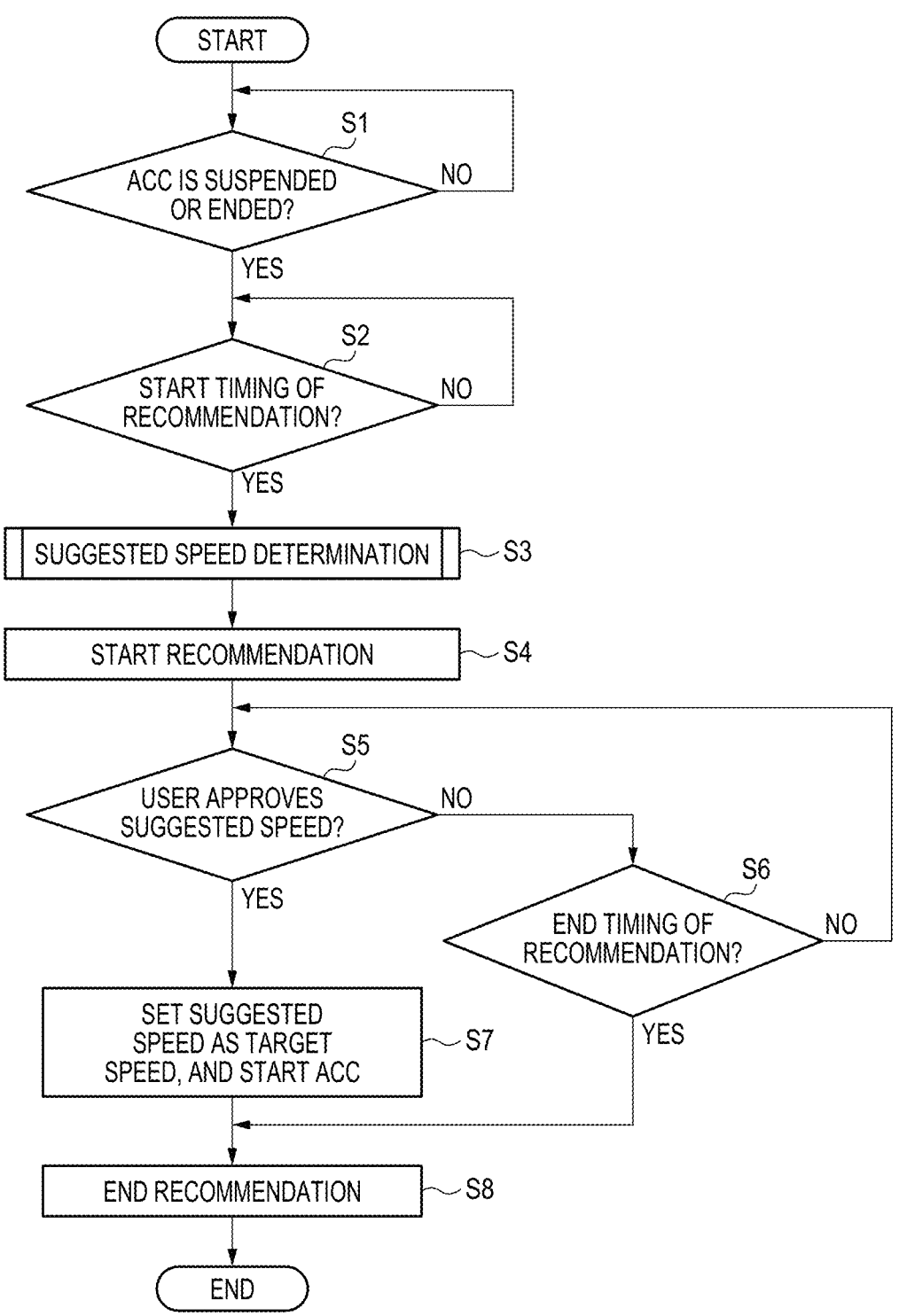
FIG. 9 is a flowchart illustrating an example of processing executed by the control device 30.

As illustrated in FIG. 9, the control device 30 waits until it is determined that the ACC is suspended or ended (loop of step S1: NO). If it is determined that the ACC is suspended or ended (step S1: YES), the control device 30 waits until it is determined that the start timing of recommendation is reached (loop of step S2: NO). If it is determined that the recommendation start timing is reached (step S2: YES), the control device 30 proceeds to the suggested speed determination (step S3) illustrated in FIG. 10.

Figure 10:
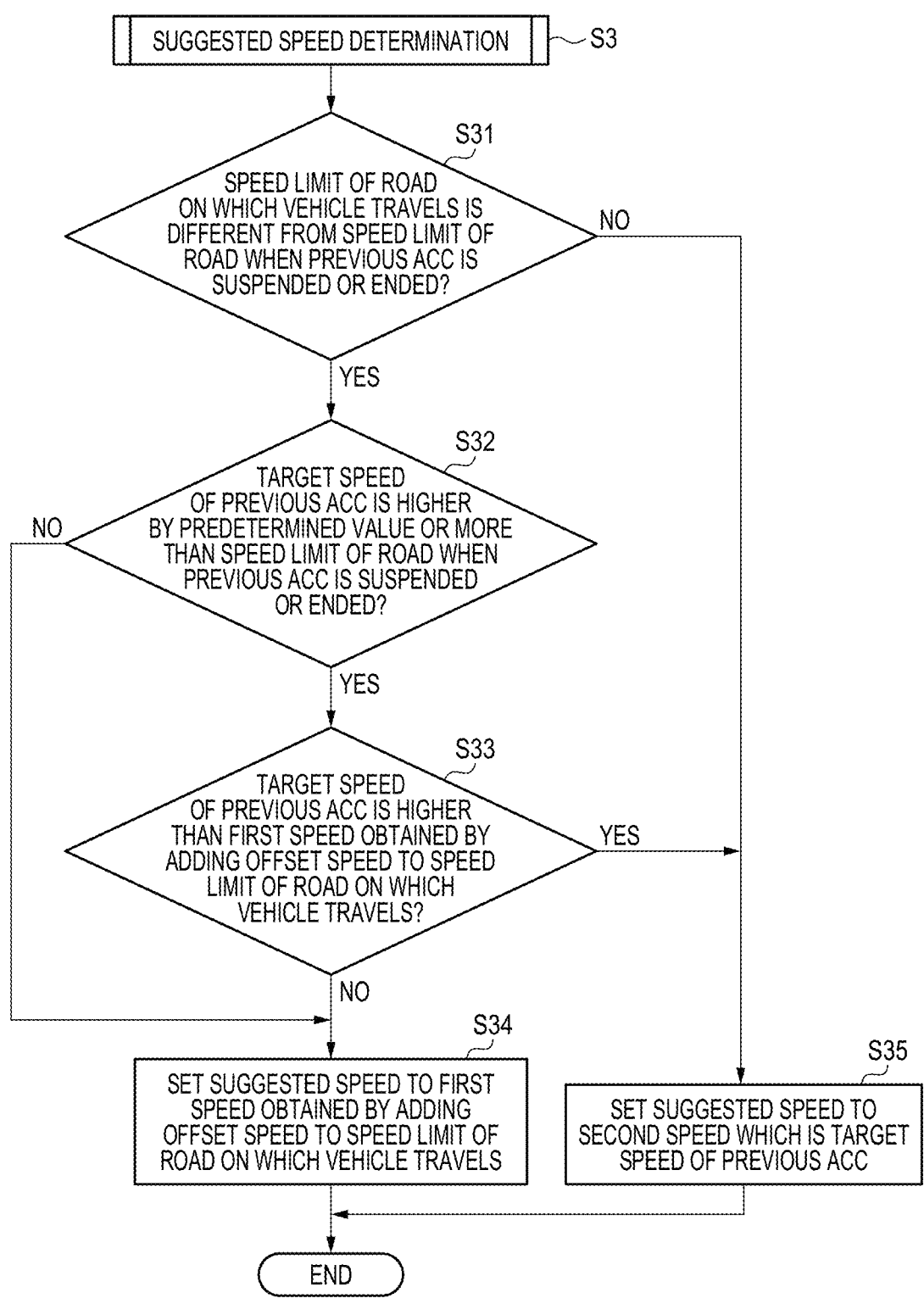
FIG. 10 is a flowchart illustrating an example of suggested speed determination.

As illustrated in FIG. 10, in the suggested speed determination (step S3), the control device 30 first determines whether the speed limit of the road on which the vehicle 1 travels is different from the speed limit of the road when the previous ACC is suspended or ended (step S31). If it is determined that the speed limit of the road on which the vehicle 1 travels is the same as the speed limit of the road when the previous ACC is suspended or ended (step S31: NO), the control device 30 proceeds to the processing of step S35 described later.

On the other hand, if it is determined that the speed limit of the road on which the vehicle 1 travels is different from the speed limit of the road when the previous ACC is suspended or ended (step S31: YES), the control device 30 determines whether the target speed of the previous ACC is higher by a predetermined value or more than the speed limit of the road when the previous ACC is suspended or ended (step S32). As a result, if it is determined that target speed of the previous ACC is not higher by a predetermined value or more than the speed limit of the road when the previous ACC is suspended or ended (step S32: NO), the control device 30 proceeds to the processing of step S34.

On the other hand, if it is determined that the target speed of the previous ACC is higher by a predetermined value or more than the speed limit of the road when the previous ACC is suspended or ended (step S32: YES), the control device 30 determines whether the target speed of the previous ACC is higher than the first speed obtained by adding the offset speed to the speed limit of the road on which the vehicle 1 travels (step S33). As a result, if it is determined that the target speed of the previous ACC is not higher than the first speed obtained by adding the offset speed to the speed limit of the road on which the vehicle 1 travels (step S33: NO), the control device 30 sets the first speed obtained by adding the offset speed to the speed limit of the road on which the vehicle 1 travels as the suggested speed (step S34), and ends the present suggested speed determination.

On the other hand, if it is determined that the target speed of the previous ACC is higher than the first speed obtained by adding the offset speed to the speed limit of the road on which the vehicle 1 travels (step S33: YES), the control device 30 sets the second speed, which is the target speed of the previous ACC, as the suggested speed (step S35), and ends the present suggested speed determination.

After executing the suggested speed determination (step S3) illustrated in FIG. 10, the control device 30 proceeds to the processing of step S4 of FIG. 9. In the processing of step S4, the control device 30 starts the recommendation (step S4). For example, as described above, the control device 30 performs the recommendation by displaying the recommendation image G1 or the recommendation image G2 on the MID 91, and presents the user the suggested speed determined by the latest suggested speed determination (step S3).

Next, the control device 30 determines whether the user approves the suggested speed (for example, whether the approval button 81 is pressed) (step S5). If it is determined that the user approves the suggested speed (step S5: YES), the control device 30 sets the suggested speed as the target speed, starts the ACC (step S7), ends the recommendation (step S8), and ends the series of processing illustrated in FIG. 9.

On the other hand, if it is determined that the user does not approve the suggested speed (step S5: NO), the control device 30 determines whether the end timing of the recommendation is reached (step S6). If it is determined that the end timing of the recommendation is not reached (step S6: NO), the control device 30 returns to the processing of step S5. On the other hand, if it is determined that the end timing of the recommendation is reached (step S6: YES), the control device 30 proceeds to the processing of step S8, ends the recommendation, and ends the series of processing illustrated in FIG. 9.

As described above, the control device 30 presents the user, as the suggested speed, either the first speed based on the speed limit of the road on which the vehicle 1 travels or the second speed set by the user of the vehicle 1 (see step S34, step S35, step S4, etc.), and starts the ACC with the suggested speed as the target speed (see step S8) in response to the user's approval of the suggested speed (see the branch from step S5: YES). Accordingly, the user can cause the vehicle 1 to travel at an appropriate or desired speed with a simple operation of approving the presented suggested speed.

Alternatively, the vehicle 1 may be provided with independent operation switches for each of the first speed and the second speed, such as an operation switch for setting the first speed as the target speed and an operation switch for setting the second speed as the target speed. Thereby, the user can selectively use these operation switch to set the first speed as the target speed or set the second speed as the target speed. However, in such a case, it is necessary to selectively use a plurality of operation switches, which may cause confusion for the user. In this regard, according to the configuration of the present embodiment, the operation burden on the user for setting the target speed is reduced and the use of the ACC is facilitated when performing the ACC. As a result, it is possible to improve the convenience of the user and improve the safety of the vehicle 1. This can further improve traffic safety and contribute to development of a sustainable transportation system.

For example, after merging from a junction on a highway, the vehicle 1 may suspend or end the ACC and then resume the ACC in a situation where there is a preceding vehicle ahead. In such a situation, many users prefer following the preceding vehicle to obeying the speed limit of the road on which the vehicle 1 travels. As described above, since the ACC includes the inter-vehicle distance control, the vehicle 1 cannot follow the preceding vehicle in such a situation even if recommended the first speed or the second speed. If desiring to follow the preceding vehicle, the user may take effort (operation) to set the target speed of the ACC again. In order to prevent the occurrence of such effort, the control device 30 may control the vehicle 1 as follows.

Figure 11:
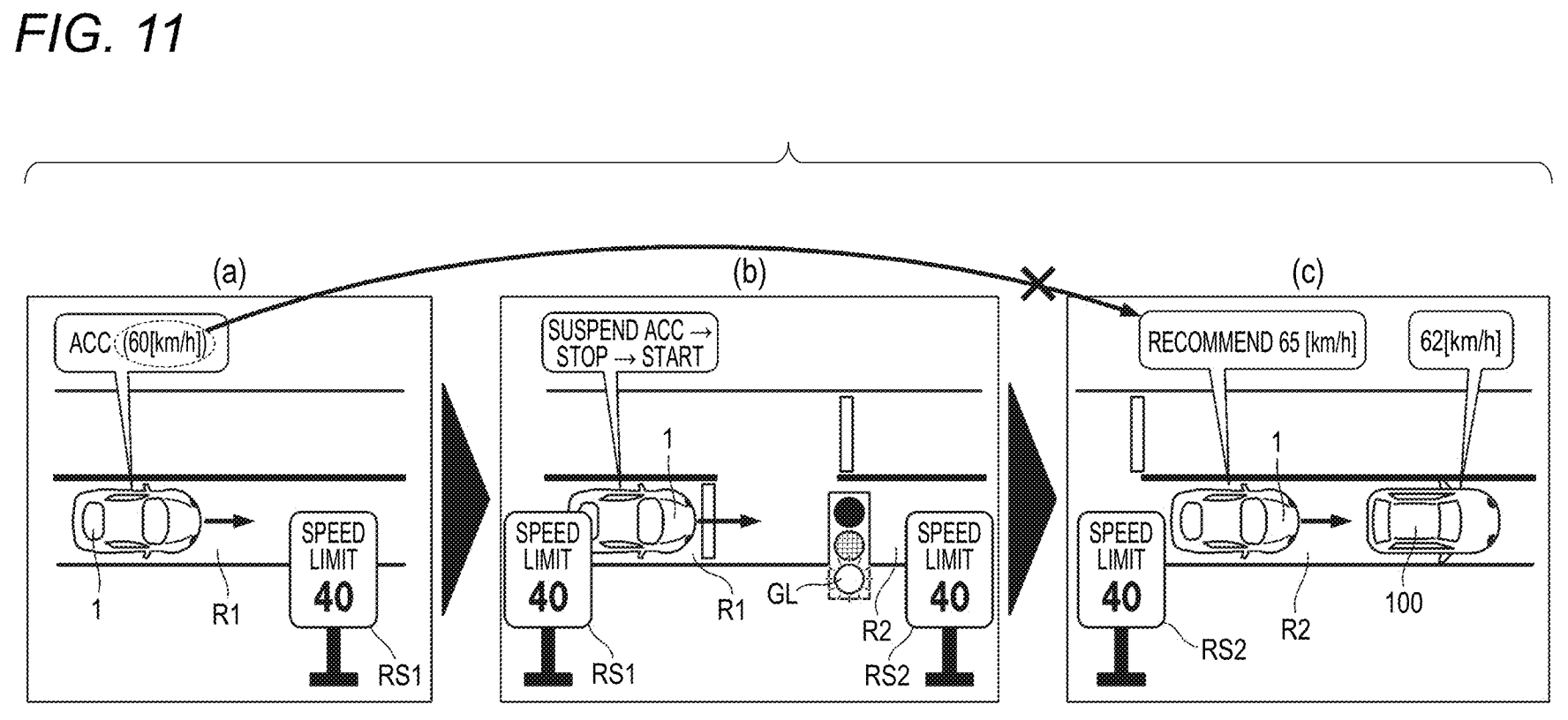

FIG. 11 illustrates an operation example of the vehicle 1 when a preceding vehicle traveling is present in front of the vehicle 1. In (a) of FIG. 11, the vehicle 1 is traveling on the road R1 under ACC. The speed limit indicated by the speed sign RS1 of the road R1 is 40 [km/h], while the target speed of the ACC (second speed) is set to 60 [km/h].

Thereafter, as illustrated in (b) of FIG. 11, it is assumed that the user suspends (or ends) the ACC and stops the vehicle 1 before the intersection CS, and then starts the vehicle 1 by performing an accelerator operation to cause the vehicle 1 to enter the road R2 ahead of the intersection CS of the road R1. In the example illustrated in FIG. 11, similarly to the road R1, the speed limit of the road R2 is also 40 [km/h], and the road R2 is provided with a speed sign RS2 indicating that the speed limit is 40 [km/h]. In such a case, when the vehicle 1 is traveling on the road R2, the control device 30 detects the speed limit 40 [km/h] of the road R2 by TSR performed by the detection unit 33.

As illustrated in (c) of FIG. 11, a preceding vehicle 100 traveling in front of the vehicle 1 is present on the road R2. The preceding vehicle 100 travels at 62 [km/h]. In such a situation, even if recommended the first speed (here, 40 [km/h]+offset speed), which is based on the speed limit of the road R2 on which the vehicle 1 travels, or the second speed (here, 60 [km/h]), which is the target speed of the previous ACC, the vehicle 1 cannot follow the preceding vehicle 100 at the suggested speed presented by the recommendation.

If the travel speed of the preceding vehicle 100 is higher than the first speed and the second speed in this way, the control device 30 (the presentation unit 34) presents the user a third speed based on the travel speed of the preceding vehicle 100 as the suggested speed. In the example illustrated in FIG. 11, the control device 30 recommends a third speed 65 [km/h], which is higher than the travel speed 62 [km/h] of the preceding vehicle 100, as the suggested speed. Thus, even if the travel speed of the preceding vehicle 100 is higher than the first speed and the second speed, the user can cause the vehicle 1 to travel so as not to be left behind by the preceding vehicle 100 by a simple operation of approving the suggested speed presented by the recommendation. This can improve the convenience of the user.

A control method described in the present embodiment can be implemented by a computer executing a program prepared in advance. The present program is stored in a computer-readable storage medium, and is executed by being read from the storage medium. Further, the present program may be provided in a form of being stored in a non-volatile (non-transitory) storage medium such as a flash memory, or may be provided via a network such as the Internet. The computer that executes the present program may be provided in the vehicle 1, or may be provided in the external device 2 (for example, a server device) that can communicate with the vehicle 1.

Although one embodiment of the present disclosure has been described, it goes without saying that the present disclosure is not limited to this embodiment. It is apparent that those skilled in the art can conceive of various modifications and alterations within the scope described in the claims, and it is understood that such modifications and alterations naturally fall within the technical scope of the present disclosure. Further, the constituent elements in the embodiment described above may be combined freely in a scope not departing from the gist of the disclosure.

For example, in the above-described embodiment, a four-wheeled automobile is used as an example of the vehicle, but the present disclosure is not limited thereto. A vehicle to which the technique of the present disclosure can be applied may be a two-wheeled automobile (so-called motorcycle).

In the embodiment described above, an example in which the travel control in the present disclosure is the ACC has been described, but the present disclosure is not limited thereto. For example, the travel control in the present disclosure may be constant speed travel control not including the inter-vehicle distance control (cruise control).

In the present description, at least the following matters are described. Although corresponding constituent elements or the like in the embodiment described above are shown in parentheses, the present disclosure is not limited thereto.

(1) A vehicle control device (control device 30) for controlling a vehicle 1, the control device including:

a detection unit (detection unit 33) configured to detect a speed limit of a road (road R2) on which the vehicle travels based on peripheral information on the vehicle obtained by an external sensor (sensor group 10) that the vehicle has;

a presentation unit (presentation unit 34) configured to present a user of the vehicle, as a suggested speed, either a first speed based on the speed limit detected by the detection unit or a second speed set by the user; and a travel control unit (travel control unit 35) configured to perform travel control of controlling a travel speed of the vehicle in response to the user's approval of the suggested speed, in which the suggested speed presented by the presentation unit is set as a target speed.

According to (1), either the first speed based on the speed limit of the road on which the vehicle travels or the second speed set by the user of the vehicle can be presented to the user as the suggested speed, and the travel control of the vehicle with the suggested speed as the target speed can be performed in response to the user's approval of the suggested speed. Accordingly, the user can cause the vehicle to travel at an appropriate or desired speed with a simple operation of approving the presented suggested speed. Thus, the safety of the vehicle and the convenience of the user can be improved. This can further improve traffic safety and contribute to development of a sustainable transportation system.

(2) The vehicle control device according to (1), in which the presentation unit presents the user the first speed as the suggested speed when the speed limit of the road on which the vehicle travels is different from a speed limit of a road (road R1) on which a previous travel control is suspended or ended.

If the speed limit of the road on which the vehicle is currently traveling is different from the speed limit of the road on which the previous travel control is suspended or ended, the first speed is more likely the target speed currently desired by the user than is the second speed. According to (2), if the speed limit of the road on which the vehicle travels is different from the speed limit of the road on which the previous travel control is suspended or ended, the first speed, which is more likely the target speed desired by the user, is presented to the user as the suggested speed. Thereby, the user can cause the vehicle to travel at a desired speed by a simple operation of approving the suggested speed. This can improve the convenience of the user.

(3) The vehicle control device according to (1), in which the second speed is a target speed of a previous travel control, and the presentation unit presents the user the second speed as the suggested speed when the speed limit of the road on which the vehicle travels is the same as a speed limit of a road on which the previous travel control is suspended or ended.

If the speed limit of the road on which the vehicle is currently traveling is the same as the speed limit of the road on which the previous travel control is suspended or ended, the second speed is more likely the target speed currently desired by the user than is the first speed. According to (3), if the speed limit of the road on which the vehicle travels is the same as the speed limit of the road which the previous travel control is suspended or ended, the second speed, which is more likely the target speed desired by the user is presented to the user as the suggested speed. Thereby, the user can cause the vehicle to travel at a desired speed by a simple operation of approving the suggested speed. This can improve the convenience of the user.

(4) The vehicle control device according to (1), in which the second speed is a target speed of the previous travel control, and the presentation unit presents the user the second speed as the suggested speed when the second speed deviates by a predetermined value or more from the speed limit of the road on which the previous travel control is suspended or ended.

If the previous travel control causes the vehicle to travel at a target speed deviated by a predetermined value or more from the speed limit of the road, it is considered that the user desires to cause the vehicle to travel at this speed regardless of the speed limit of the road under certain circumstances. According to (4), if the second speed, which is the target speed of the previous travel control, deviates by the predetermined value or more from the speed limit of the road on which the previous travel control is suspended or ended, the second speed, which is more likely the target speed desired by the user, is presented to the user as the suggested speed. Thereby, the user can cause the vehicle to travel at a desired speed by a simple operation of approving the suggested speed. This can improve the convenience of the user.

(5) The vehicle control device according to (4), in which the presentation unit presents the user the second speed as the suggested speed when the second speed is higher by the predetermined value or more than the speed limit of the road on which the previous travel control is suspended or ended.

If the previous travel control causes the vehicle to travel at a target speed higher by the predetermined value or more than the speed limit of the road, it is considered that the user desires to cause the vehicle to travel at this speed regardless of the speed limit of the road under certain circumstances. According to (5), if the second speed, which is the target speed of the previous travel control, is higher by the predetermined value or more than the speed limit of the road on which the previous travel control is suspended or ended, the second speed, which is more likely the target speed desired by the user, is presented to the user as the suggested speed. Thereby, the user can cause the vehicle to travel at a desired speed by a simple operation of approving the suggested speed. This can improve the convenience of the user.

(6) The vehicle control device according to (5), in which the predetermined value is greater than an offset speed set by the user.

If the second speed, which is the target speed of the previous travel control, is greater by the offset speed set by the user than the speed limit of the road on which the previous travel control is suspended or ended, it is considered that the user desires to cause the vehicle to travel at this speed. According to (6), if the second speed, which is the target speed of the previous travel control, is higher by the offset speed set by the user than the speed limit of the road on which the previous travel control is suspended or ended, the second speed, which is more likely the target speed desired by the user, is presented to the user as the suggested speed. Thereby, the user can cause the vehicle to travel at a desired speed by a simple operation of approving the suggested speed. This can improve the convenience of the user.

(7) The vehicle control device according to (6), in which the first speed is a sum of the speed limit of the road on which the vehicle travels and the offset speed, and the presentation unit presents the user the second speed as the suggested speed when the second speed is higher by the predetermined value or more than the speed limit of the road on which the previous travel control is suspended or ended and is higher than the first speed, and presents the user the first speed as the suggested speed if the second speed is higher by the predetermined value or more than the speed limit of the road on which the previous travel control is suspended or ended and is lower than the first speed.

According to (7), the higher one of the first speed and the second speed is presented to the user as the suggested speed. Therefore, the user can cause the vehicle to travel at a desired speed by a simple operation of approving the suggested speed. This can improve the convenience of the user.

(8) The vehicle control device according to (1), in which the presentation unit changes a presentation time of the suggested speed depending on a difference between the suggested speed and a travel speed of the vehicle when the suggested speed is presented to the user.

If the travel speed of the vehicle when the suggested speed is presented is close to the suggested speed, it is considered that the user is more likely to approve the suggested speed. On the other hand, if the travel speed of the vehicle when the suggested speed is presented deviates from the suggested speed, it is considered that the user is less likely to approve the suggested speed. According to (8), by changing the presentation time of the suggested speed depending on the difference between the suggested speed and the travel speed of the vehicle when the suggested speed is presented to the user, the presentation time of the suggested speed can be lengthened in a situation where it is assumed that the user is more likely to approve the suggested speed, thereby preventing the user from failing to approve the suggested speed. On the other hand, the presentation time of the suggested speed can be shortened in a situation where it is assumed that the user is less likely to approve the suggested speed, thereby preventing the presentation of the suggested speed that may annoy the user from continuing over a long time.

(9) The vehicle control device according to (8), in which the presentation unit shortens the presentation time in a case where the difference between the suggested speed and the travel speed of the vehicle when the suggested speed is presented to the user is large, compared to a case where the difference is small.

It is considered that a greater difference (that is, deviation) between the suggested speed and the travel speed of the vehicle when the suggested speed is presented makes the user less likely to approve the suggested speed. According to (9), the presentation time of the suggested speed can be shortened as the difference between the suggested speed and the travel speed of the vehicle when the suggested speed is presented, thereby preventing the presentation of the suggested speed that annoy the user from continuing over a long time.

(10) The vehicle control device according to (8), in which the presentation unit shortens the presentation time in a case where the travel speed of the vehicle when the suggested speed is presented to the user is higher than the suggested speed, compared to a case where the travel speed of the vehicle is lower than the suggested speed.

If the travel speed of the vehicle when the suggested speed is presented is higher than the suggested speed, it is considered that the user is less likely to approve the suggested speed. According to (10), the presentation time of the suggested speed can be shortened if the travel speed of the vehicle when the suggested speed is presented is higher than the suggested speed, thereby preventing the presentation of the suggested speed that annoy the user from continuing over a long time.

(11) The vehicle control device according to (1), in which when a preceding vehicle traveling in front of the vehicle is present and a speed of the preceding vehicle is higher than the first speed and the second speed, the presentation unit presents the user a third speed based on the speed of the preceding vehicle as a suggested speed.

According to (11), if the speed of the preceding vehicle is higher than the first speed and the second speed, the third speed based on the speed of the preceding vehicle is presented to the user as the suggested speed. Thereby, the user can cause the vehicle to travel so as not to be left behind by the preceding vehicle by a simple operation of approving the suggested speed. This can improve the convenience of the user.

(12) A control method performed by a computer for controlling a vehicle, the control method including:

detecting a speed limit of a road on which the vehicle travels based on peripheral information on the vehicle obtained by an external sensor that the vehicle has;

presenting a user of the vehicle, as a suggested speed, either a first speed based on the speed limit detected by the detection unit or a second speed set by the user; and performing travel control of controlling a travel speed of the vehicle in response to the user's approval of the suggested speed, in which the presented suggested speed is set as a target speed.

According to (12), either the first speed based on the speed limit of the road on which the vehicle travels or the second speed set by the user of the vehicle can be presented to the user as the suggested speed, and the travel control of the vehicle with the suggested speed as the target speed can be performed in response to the user's approval of the suggested speed. Accordingly, the user can cause the vehicle to travel at an appropriate or desired speed with a simple operation of approving the presented suggested speed. Thus, the safety of the vehicle and the convenience of the user can be improved. This can further improve traffic safety and contribute to development of a sustainable transportation system.

The invention claimed is:

1. A vehicle control device for controlling a vehicle, the control device comprising circuitry configured to:

detect a speed limit of a road on which the vehicle travels based on peripheral information on the vehicle obtained by an external sensor that the vehicle has;

present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed, wherein the circuitry is configured to present the user the first speed as the suggested speed when the speed limit of the road on which the vehicle travels is different from a speed limit of a road on which the vehicle travels when a previous travel control is suspended or ended, the previous travel control being suspended or terminated just before the travel control currently being performed.

2. A vehicle control device for controlling a vehicle, the control device comprising circuitry configured to:

detect a speed limit of a road on which the vehicle travels based on peripheral information on the vehicle obtained by an external sensor that the vehicle has;

present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed, wherein the second speed is a target speed of a previous travel control that is suspended or terminated just before the travel control currently being performed, and the circuitry is configured to present the user the second speed as the suggested speed when the speed limit of the road on which the vehicle travels is the same as a speed limit of a road on which the vehicle travels when the previous travel control is suspended or ended just before the travel control currently being performed.

3. A vehicle control device for controlling a vehicle, the control device comprising circuitry configured to:

detect a speed limit of a road on which the vehicle travels based on peripheral information on the vehicle obtained by an external sensor that the vehicle has;

present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed, wherein the second speed is a target speed of a previous travel control that is suspended or terminated just before the travel control currently being performed, and the circuitry is configured to present the user the second speed as the suggested speed when the second speed deviates by a predetermined value or more from a speed limit of a road on which the vehicle travels when the previous travel control is suspended or ended just before the travel control currently being performed.

4. The vehicle control device according to claim 3, wherein the circuitry is configured to present the user the second speed as the suggested speed when the second speed is higher by the predetermined value or more than the speed limit of the road on which the previous travel control is suspended or ended just before the travel control currently being performed.

5. The vehicle control device according to claim 4, wherein the predetermined value is greater than an offset speed set by the user.

6. The vehicle control device according to claim 5, wherein the first speed is a sum of the speed limit of the road on which the vehicle travels and the offset speed, and the circuitry is configured to present the user the second speed as the suggested speed when the second speed is higher by the predetermined value or more than the speed limit of the road on which the previous travel control is suspended or ended and is higher than the first speed, and the circuitry is configured to present the user the first speed as the suggested speed when the second speed is higher by the predetermined value or more than the speed limit of the road on which the vehicle travels when the previous travel control is suspended or ended just before the travel control currently being performed and is lower than the first speed.

7. A vehicle control device for controlling a vehicle, the control device comprising circuitry configured to:

detect a speed limit of a road on which the vehicle travels based on peripheral information on the vehicle obtained by an external sensor that the vehicle has;

present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed, wherein the circuitry is configured to change a presentation time of the suggested speed depending on a difference between the suggested speed and a travel speed of the vehicle when the suggested speed is presented to the user.

8. The vehicle control device according to claim 7, wherein the circuitry is configured to shorten the presentation time if the difference between the suggested speed and the travel speed of the vehicle when the suggested speed is presented to the user is large, compared to a case where the difference is small.

9. The vehicle control device according to claim 7, wherein the circuitry is configured to shorten the presentation time if the travel speed of the vehicle when the suggested speed is presented to the user is higher than the suggested speed, compared to a case where the travel speed of the vehicle is lower than the suggested speed.

10. A vehicle control device for controlling a vehicle, the control device comprising circuitry configured to:

detect a speed limit of a road on which the vehicle travels based on peripheral information on the vehicle obtained by an external sensor that the vehicle has;

present a user of the vehicle, as a suggested speed, either a first speed based on the detected speed limit or a second speed set by the user; and perform travel control of controlling a travel speed of the vehicle in response to the user's approval of the suggested speed, in which the suggested speed is set as a target speed, wherein if a preceding vehicle traveling in front of the vehicle is present and a speed of the preceding vehicle is higher than the first speed and the second speed, the circuitry is configured to present the user a third speed based on the speed of the preceding vehicle as a suggested speed.

* * * * *